July 12, 1966

R. J. DICKIE 3,260,123

VIBRATION ISOLATING GIMBAL

Filed Sept. 3, 1963

ROBERT J. DICKIE
INVENTOR.

BY
*Thomas W. Kennedy*
ATTORNEY

July 12, 1966  R. J. DICKIE  3,260,123
VIBRATION ISOLATING GIMBAL
Filed Sept. 3, 1963  3 Sheets-Sheet 2

ROBERT J. DICKIE
INVENTOR.

BY
Thomas W. Kennedy
ATTORNEY

July 12, 1966
R. J. DICKIE
3,260,123
VIBRATION ISOLATING GIMBAL
Filed Sept. 3, 1963
3 Sheets-Sheet 3
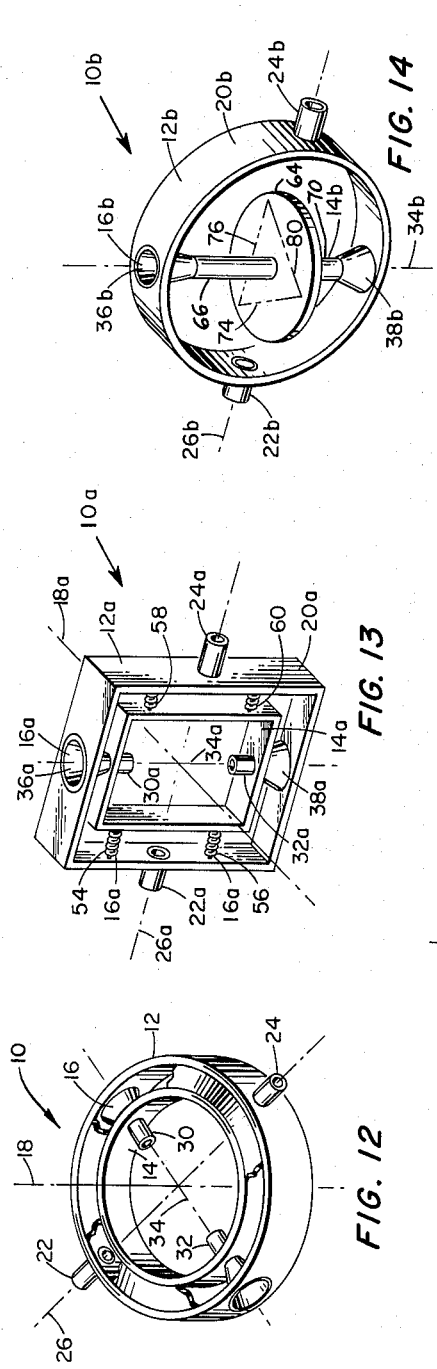
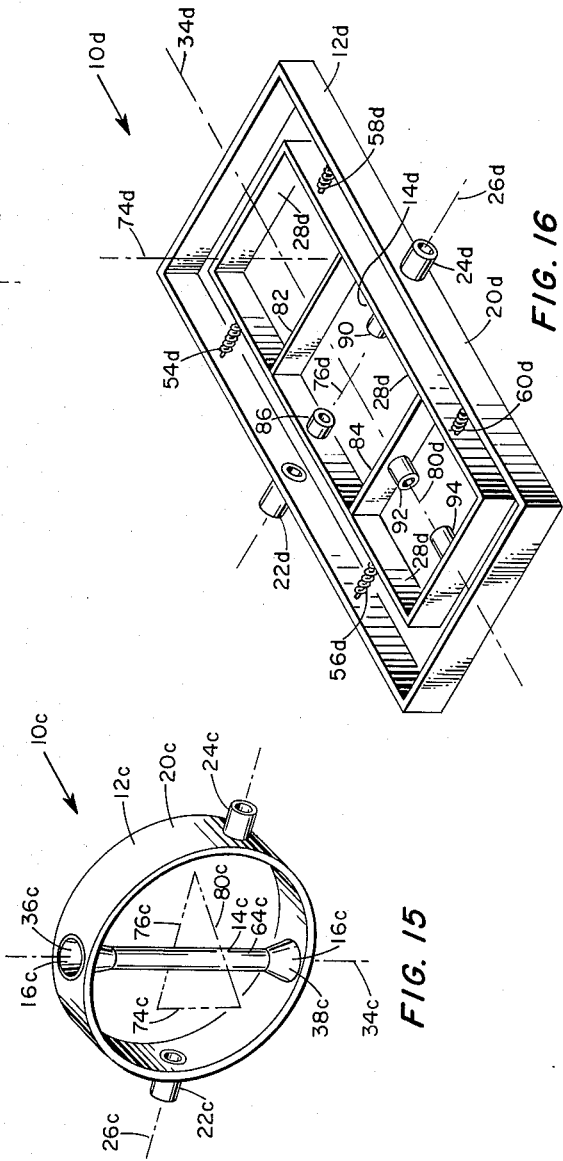
ROBERT J. DICKIE
INVENTOR.
BY
Thomas W. Kennedy
ATTORNEY

United States Patent Office 3,260,123
Patented July 12, 1966

3,260,123
VIBRATION ISOLATING GIMBAL
Robert J. Dickie, Maywood, N.J., assignor to General Precision Inc., Little Falls, N.J., a corporation of Delaware
Filed Sept. 3, 1963, Ser. No. 305,965
7 Claims. (Cl. 74—5.5)

The present invention relates to gyroscopes and like instruments having relatively pivotable parts and more particularly to gimbal structures for such instruments.

In the past, in a gyroscope subject to outside vibration, in particular one having a plurality of gimbals, methods have been tried to prevent outside vibration from entering the gyroscope and disturbing the sensitive portion within the inner gimbal. One method attempted to prevent such vibration disturbance was to provide spring means such as rubber mounts, on the external supports of the outer gyro gimbal or outer gyro housing. With this method, vibrations of certain frequencies are partly isolated; however, vibrations of certain other frequencies are not isolated and can enter the gyroscope. Another objection to this method is that in a complex gyroscopic device, such as a stable platform, which has a cluster of gyros within the inner gimbal, in addition to other instruments within the outer housing, this method isolates the entire device and housing, while it is more effective to merely isolate the gyros within the inner gimbal of the device. A second method tried to prevent such vibration from reaching the sensitive portion within the inner gimbal, was to use an inner gimbal of laminated construction of the type disclosed in U.S. patent application Serial No. 74,058, now Patent No. 3,134,265, assigned to the same assignee as this application. With this, the vibration reaching the laminated gimbal is not substantially isolated, but is damped out. By analogy, the vibration is not kept out of the gimbal, but is permitted to enter and is then suppressed by the gimbal. Such a laminated gimbal provides a frictional type of damping and is very effective in minimizing the transmission of vibration at certain frequencies at or near the resonant frequency. However, it does not substantially dampen or isolate vibration at certain other frequencies, particularly those which are substantially different from the resonant frequency of the system to be protected.

Accordingly, it is a primary object of this invention to provide a gimbal which can damp-out vibration at certain frequencies at or near the resonant frequency of the system and can also isolate vibration at most other frequencies which are higher than said resonant frequency.

Another object of the invention is to provide a gimbal structure having a very low spring rate in comparison to prior art gimbal structures of equivalent size, strength and stiffness.

Therefore, in order to fulfill the above objects, an elastic damping system is provided, in accordance with the invention, in a gyroscope having at least one high speed rotor, for pivotally suspending the rotor about a pivot axis. The damping system includes a gimbal comprising an outer rigid strutcure and an inner rigid structure, interconnected solely by spring means.

Other objects of the invention will become apparent upon reading the annexed detailed description in connection with the drawings in which:

FIGURE 12 is a perspective view of the embodiment illustrated in FIGURES 1 to 10 inclusive;

FIGURE 13 is a perspective view of a second embodiment of a gimbal mounting in accordance with the invention;

FIGURE 14 is a perspective view of a third embodiment of a gimbal mounting in accordance with the invention;

FIGURE 15 is a perspective view of a fourth embodiment of a gimbal mounting in accordance with the invention;

FIGURE 16 is a perspective view of a fifth embodiment of a gimbal mounting in accordance with the invention.

Figure 3:
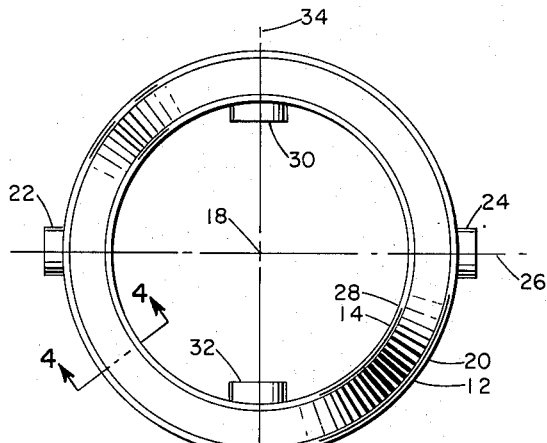
FIGURE 3 is a plan-sectional view as taken on line 3—3 of FIGURE 1.
Figure 7:
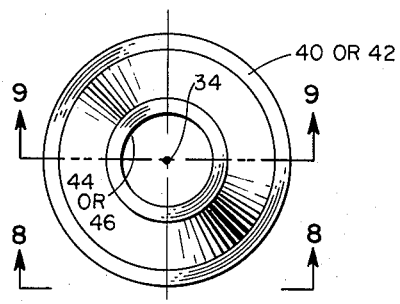
FIGURE 7 is a sectional view as taken on line 7—7 of FIGURE 2.
Figure 8:
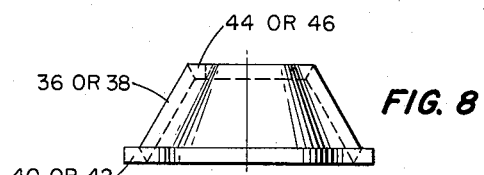
FIGURE 8 is a sectional view as taken on line 8—8 of FIGURE 7.

Referring now to the drawings, in FIGURES 1 through 10, there is illustrated a preferred embodiment 10 of the invention comprising an outer rigid frame structure 12, and in inner rigid structure 14 disposed within said outer rigid frame structure 12. Structures 12 and 14 have a common axis 18 and are interconnected by spring means 16. This preferred embodiment of a gimbal mounting or gyro support structure 10 is used as an inner gimbal for supporting a single gyro unit, which has a rotor, the spin axis of which preferably corresponds to common axis 18. The gimbal mounting or gyro support structure 10 may also be described or termed a gimbal structure, or merely, a gimbal.

Outer rigid structure 12 has a one-piece, outer frame member 20 and a pair of outer pivot means or trunnions 22 and 24. Frame member 20 has an outer pivot axis 26, which is coaxial with pivot means 22 and 24. Frame member 20 preferably is a cylindrical shell having an arcuate cross-section, preferably one which is also a spherical shell having a pair of opposite equal-size openings. Outer pivot axis 26 is transverse to common axis 18, and, in this embodiment, is used as the input axis of the gimbal. Pivot means or trunnions 22 and 24 are preferably tubular members and may function as either gimbal pivot hubs or gimbal pivot pins. In FIGURES 1 through 10 of this embodiment, pivot means 22 and 24 are used as hubs.

Inner rigid structure 14 has a one-piece inner frame member 28, which is identical in construction and shape to outer frame member 20, except that inner member 28 is of smaller size. Outer member 20 and inner member 28 are coaxial along common axis 18. Inner structure 14 also has a pair of inner pivot means or trunnions 30 and 32 preferably identical in construction with outer pivot means 22 and 24. Inner structure 14 has an inner pivot axis 34, which is also the axis of said inner pivot means 30 and 32. In this embodiment, inner pivot axis 34 is used as the precession or output axis of the gyro.

Spring means 16 includes a pair of annular spring members 36 and 38, which are preferably cone-shaped, and also, preferably consist at least in part of rubber-like material. Spring member 36 surrounds and is coaxial with one inner pivot 30; and spring member 38 surrounds and is coaxial with the other inner pivot 32. The larger-diameter end of each cone-shaped spring 36 or 38 is joined to the outer structure 12, and the smaller-diameter end is joined to inner structure 14. Each spring member 36 and 38 preferably has a ring at each end, that is, spring member 36 has ring 40 at its large end and ring 44 at its small end; and spring member 38 similarly has a large ring 42 and a small ring 46. Such rings 40, 42, 44 and 46 on spring members 36 and 38 are primarily used to facilitate manufacture of the spring members 36 and 38 and to simplify the assembly of the spring members 36 and 38 on the gimbal structure 10. To facilitate manufacture, it is possible to use rubber-like material and to mold spring members 36 and 38 which can then be bonded to their respective rings 40 and 44 or 42 and 46 using an adhesive in a temperature controlled process. Thereafter, spring members 36 and 38 can be assembled on gimbal 10 by connecting their rings 40 and 42 respectively to outer structure 12 and rings 44 and 46 respectively to inner structure 14. In this design, the rings 40, 42, 44 and 46 can be made of a similar metal as that of outer structure 12 and inner structure 14, and can be connected simply by bolting, or like process, for ease of assembly. If desired, additional cone-shaped spring members, similar to spring members 36 and 38, may be provided on pivots 22 and 24 for interconnecting structures 12 and 14.

Figure 1:
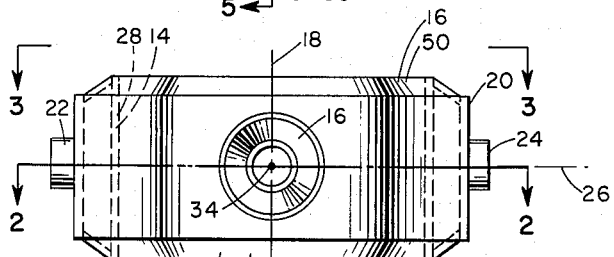
FIGURE 1 is an elevation view of a gimbal mounting embodying features of the present invention.
Figure 4:
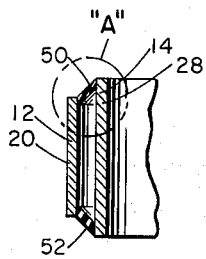
FIGURE 4 is a sectional view as taken on line 4—4 of FIGURE 2.
Figure 5:
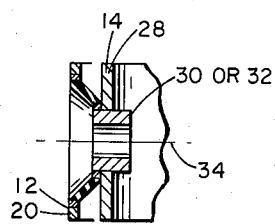
FIGURE 5 is a sectional view as taken on line 5—5 of FIGURE 2.
Figure 6:
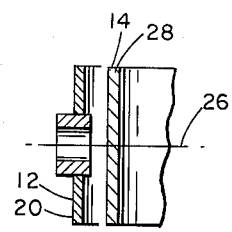
FIGURE 6 is a sectional view as taken on line 6—6 of FIGURE 2.

Spring means 16 also preferably includes a plurality of ring-shaped spring strips 50 and 52 interconnecting the adjacent edges of frame members 20 and 28. As illustrated in FIGURE 1, the adjacent upper edges of frame members 20 and 28 are connected by one spring strip 50 and the adjacent lower edges are connected by another spring strip 52. Spring strips 50 and 52 may be used separately from, or in combination with, annular spring members 36 and 38 as the necessary spring means 16 for the gimbal 10. Each spring strip is preferably an annular strip, consisting at least in part of rubber-like material, and also preferably having a one-piece ring construction, with a radially inner face of substantially the same radius as the outer surface of inner structure 14, and with a radially outer face of substantially the same radius as the inner surface of the outer structure 12.

Figure 2:
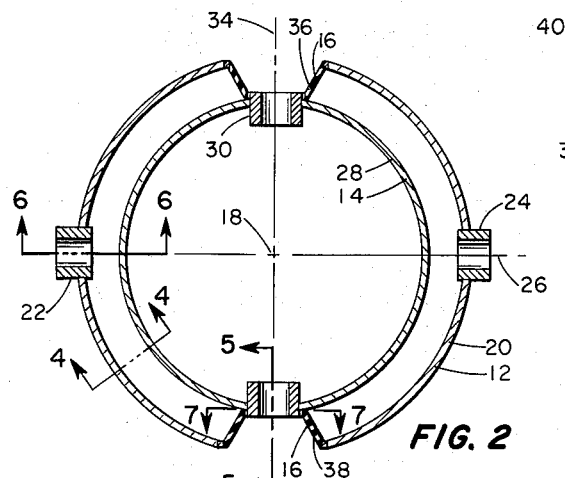
FIGURE 2 is a plan-sectional view as taken on line 2—2 of FIGURE 1.
Figure 9:
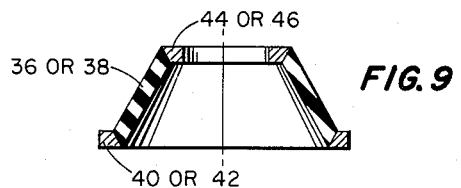
FIGURE 9 is a sectional view as taken on line 9—9 of FIGURE 7.
Figure 10:
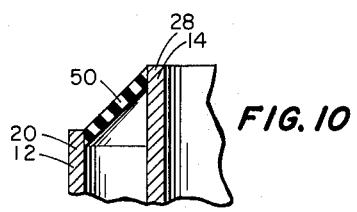
FIGURE 10 is an enlarged detail of portion "A" in FIGURE 4.

Spring strips 50 and 52 are coaxial with common axis 18. In FIGURES 2 and 3, portions of the one-piece spring strips 50 and 52 have been cut away from the view to better illustrate the other parts in the embodiment. It is obvious also that said one-piece, ring-shaped spring strips 50 and 52 can each be divided into a plurality of strip lengths, spaced apart with an opening between each pair of adjacent pieces; for example, each ring 50 or 52 can be divided into four pieces, one in each of the quadrants, formed between axes 26 and 34 and best shown in FIGURES 2 and 3. Spring strips 50 and 52, if desired, can also have rings, identical in function, and similar in construction, to the rings 40, 42, 44 and 46 of annular spring members 36 and 38. The use of rubber-like material in springs 16 is beneficial as it has an hysteresis effect which dampens vibration.

Figure 11:
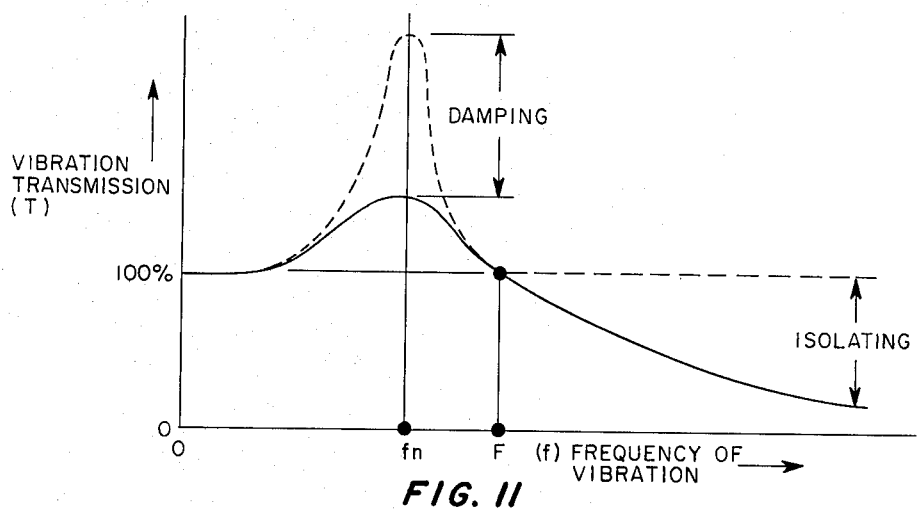
FIGURE 11 is a diagram showing vibration characteristics of the gimbal mounting in accordance with the invention.

FIGURE 11 is a diagram for plotting frequency of vibration $(f)$ along the "$x$" axis against vibration transmission $(T)$ along the "$y$" axis, and having two curves, a solid-line curve representing the transmissibility of a gimbal structure in accordance with this invention and a dash-line curve representing the transmissibility of a prior art type of gimbal structure.

The following symbols are also used in the diagram of FIGURE 11:

$f$ = frequency of vibration $F = \sqrt{2} f_n$ = frequency at 100% transmission $f_n$ = resonant frequency = $C\sqrt{\dfrac{k}{m}} = \dfrac{1}{2\pi}\sqrt{\dfrac{kg}{w}}$ (c.p.s.)

$k$ = spring constant or spring rate = pounds per inch deflection
$m$ = mass = $w/g$
$w$ = weight = pounds of weight supported by spring-like structure
$g$ = 386 in./sec.$^2$ = acceleration due to gravity
$T = \dfrac{1}{(f/f_n)^2 - 1}$ = rate of transmission of vibration, neglecting the hysteresis effect.

As schematically illustrated in FIGURE 11, at a condition of resonant frequency, a gimbal structure 10 according to this invention damps out a substantial amount of vibration normally transmitted when using the prior art form of gimbal structure. More important, however, as further illustrated in FIGURE 11, at higher frequencies, gimbal structure 10 according to this invention isolates from 10% up to 80%, depending on the excitation frequency, of the amount of vibration normally transmitted when using the prior art form of gimbal, including the laminated type. Equally important, the resonant frequency of this vibration isolating gimbal 10 may be adjusted or altered to suit the particular vibration frequency being imposed upon the gyro. This is accomplished by using different stiffness springs 16 and/or 50, and does not require physical change of structures 20 and/or 28.

Gimbal structure 10 in accordance with the invention is similar in one major respect to a laminated type of prior art gimbal, as disclosed in the aforementioned patent application Serial No. 74,058 now Patent No. 3,134,-265. Both types of gimbals are useful at a vibration frequency which is similar to the resonant frequency of the system, for the purpose of damping the resonant vibration reaching the gimbal from an outside source. For this purpose, the laminated gimbal in the reference application uses the effect of friction between laminations or frictional damping. For the same purpose, gimbal 10 of this invention uses the hysteresis effect of the rubber-like material in the spring means 16, which might be termed hysteresis damping for comparison with friction damping.

It will be noted that prior art gimbals have no provision in themselves for isolating vibration, that is, means preventing its entrance rather than forces to dampen it. In gimbal 10 of this invention, wherein spring means 16 primarily controls the spring rate of the gimbal 10, the spring rate of gimbal 10 is substantially independent of the stiffness and strength of the gimbal, which are primarily dependent on the frame members 20, 28. Thus, gimbal 10 in accordance with the invention, by a judicious choice of spring rate for a given vibration environment and proper design of springs 16, inner structure 14 can support sensitive devices and can be isolated from outer structure 16 while the latter is subject to vibration from an outside source.

The curves of FIGURE 11 and the formula indicated above are tools of gimbal designers. It will be noted from these that vibration transmission through a gimbal is a function not only of the frequency of the approaching vibration, but is also a function of the resonant frequency of the particular gimbal itself. The resonant frequency of any gimbal is mainly a function of two things; the mass it supports, and the spring rate of its structure. Thus, since the vibration transmission through the gimbal is a function of the spring rate of the gimbal which in turn is a function of the natural frequency, in certain applications where there is a range of vibration frequency, it is possible to design the gimbal according to the invention so that its resonant frequency is different than the range of frequencies which normally occur in the environment, thereby avoiding any possibility of resonant vibration and its attendant higher stresses within the gimbal.

The stiffness and strength of a gimbal of a certain size and a given material is primarily dependent on its cross-sectional dimensions. In prior art gimbals, this was also true of the spring rate of the gimbal member. With the gimbal structure 10 in accordance with the invention, having as mentioned before, structure 12 and structure 14 interconnected by spring means 16, the spring rate of gimbal 10 can be made substantially lower than could prior art gimbals, of similar size, stiffness and strength. A low spring rate in a gimbal, that is a soft structure, is better than a high rate for isolating vibrations.

This invention has the advantage that this stiffness of the gimbal is substantially independent of the stiffness of frame members 20, 28. Therefore, the stiffness of the pivotal means can remain very high while the stiffness of the gimbal is very low. This has the practical benefit of providing structural rigidity for the axis of rotation to maintain bearing alignment.

Alternate forms of spring means 16 may be used in this first embodiment of the gimbal structure 10. In place of, and in combination with, annular spring members 36 and 38, and spring strips 50 and 52, other forms of spring means 16 may be used, and may be disposed preferably in the annular gap formed between the outer surface of the inner structure 14 and the inner surface of the outer structure 12. Such alternate springs may include a plurality of small coil springs, with one end of each coil spring attached to one structure 14 or 12 and the other end of each coil spring attached to the other structure 12 or 14. A further alternate spring means may include rubber buttons bridging the annular gap between adjacent surfaces of structures 12 and 14. Each of these said alternate forms of springs may also be provided with suitable means for connecting the springs to the surfaces of structures 12 or 14, for example, metal cups or guides connected to the springs and joined to the structure surfaces.

FIGURES 12 to 16 inclusive show five different embodiments of the invention in perspective views. FIGURE 12 shows the first embodiment, which was more fully detailed in FIGURES 1 through 10 previously. For comparison with the first embodiment of FIGURE 12, the other four embodiments in FIGURES 13, 14, 15 and 16 respectively are similarly illustrated. For ease of understanding, the parts of each respective embodiment, in FIGURES 13 to 16, which are common to those of the first embodiment, in FIGURES 1 through 12 inclusive, have been designated by the same reference numerals but with a literal subscript added thereto. That is, FIGURE 13 uses subscript "a," FIGURE 14 uses subscript "b," FIGURE 15 uses subscript "c," FIGURE 16 uses subscript "d."

In FIGURE 13, gimbal mounting 10a according to the invention has an outer rigid structure 12a and an inner rigid frame structure 14a interconnected by spring means 16a, said structures 12a and 14a having a common axis 18a, which is also the spin axis in this embodiment. Outer frame structure 12a has a pair of pivot means 22a and 24a and an outer pipot axis 26a, with which pivot means 22a and 24a are coaxial. Inner frame structure 14a has a pair of inner pivot means 30a and 32a, and an inner pivot axis 34a, with which said pivot means 30a and 32a are coaxial, the inner pivot axis 34a being also used as the precession or the output axis in this embodiment. Spring means 16a includes a pair of annular spring members 36a and 38a, respectively surrounding pivot means 30a and 32a, and which are preferably cone-shaped, with their larger-diameter end being joined to outer frame 12a, and their inner-diameter end being joined to inner frame structure 14a. In addition, spring means 16a includes a plurality of coil springs 54, 56, 58 and 60, preferably each being a helical coil spring, with one end joined to outer frame structure 12a and the other end joined to inner frame structure 14a. Second embodiment 10a is similar to first embodiment 10 with the exception that frame structures 12a and 14a are preferably rectangular or square, rather than circular, and have additional spring members 54, 56, 58 and 60 of a helical type of coil spring. The helical type of spring is useful because it can be easily designed to have the same spring rate in its three structural axes.

FIGURE 14 shows a third embodiment 10b of the invention comprising an outer rigid frame structure 12b and an inner rigid structure 14b connected by spring means 16b. Outer structure 12b has a one-piece outer frame member 20b and a pair of pivot means 22b and 24b. Outer structure 12b has an axis 26b, with which said pivot means 22b and 24b are coaxial. Inner rigid structure 14b has an axis 34b transverse to said first outer structure axis 26b. Inner structure 14b includes a gyro platform member 64 having platform support members 66 and 70. Support members 66 and 70 are preferably solid cylindrical pieces disposed on either side of said gyro platform member 64, coaxially with inner axis 34b, forming a beam extending from one portion of said outer frame structure 12b to an opposite portion of said structure 12b. Spring means 16b include annular spring members 36b and 38b preferably cone-shaped, with their larger diameter end connected to outer frame structure 12b and their inner diameter end connected to the adjacent support member 66 and 70. In this way, support members 66 and 70 form a beam, which supports at its mid-portion platform member 64, and is supported at each end by spring members 36b or 38b. Platform member 64 supports three gyro units (not shown), having spin axes respectively 74, 76, 80 forming a triad. Although axes 74, 76 and 80 are illustrated as being in the plane of platform member 64, it is obvious that any one or more of said axes may also be transverse to the other two axes. Thus, this third embodiment of a gyro support structure 10b has an inner right structure 14b which is a stable platform carrying a plurality of gyro units (not shown), and is particularly useful in complex gyroscopic devices.

FIGURE 15 shows a fourth embodiment 10c of the invention comprising an outer frame rigid structure 12c and an inner rigid structure 14c interconnected by spring means 16c. Outer rigid frame structure 12c has a one-piece outer frame member 20c, and a pair of pivot means 22c, 24c, and an outer axis 26c, with which said pivot means 22c and 24c are coaxial. Inner rigid structure 14c has a gyro platform member 64c, preferably in the shape of a tubular beam, which supports three rotors (not shown) having respective axes 74c, 76c and 80c, forming a triad, preferably in a plane transverse to said platform member 64c. This fourth embodiment 10c of the invention in FIGURE 15 is similar to the third embodiment 10b in FIGURE 14, except that this has a modified platform member 64c. Platform member 64c is supported at each end by annular spring members 36c and 38c in the manner similar to the third embodiment previously explained.

A fifth and last embodiment is illustrated in FIGURE 16 and comprises an outer frame rigid structure 12d and an inner rigid frame structure 14d connected by spring means 16d. Outer structure 12d has an outer one-piece frame member 20d and a pair of pivot means 22d, 24d and an outer structure axis 26d, with which pivot means 22d, 24d are coaxial. Inner structure 14d has an inner one-piece frame member 28d and an inner structure axis 34d, which is transverse to the outer structure axis 26d. Inner frame member 28d is connected to outer frame member 20d by a plurality of springs, such as helical coil springs 54d, 56d, 58d and 60d or the like. Inner structure 14d has a plurality of partition members, preferably two members 82 and 84, which are disposed transverse to its axis 34d substantially parallel to two opposite end walls of inner frame member 28d and spaced substantially at third points along said axis 34d between said end walls of inner member 28d, thereby dividing inner structure 14d into a plurality of frame enclosures for enclosing separate rotor units. Gyro support structure 10d is designed to provide for three rotor units, each rotor unit having a separate frame enclosure. In this way, a first rotor (not shown) having a spin axis 74d is disposed in a frame enclosure between partition member 82 and one end wall of inner frame member 28d; and a second rotor (not shown) having a spin axis 76d is disposed in a second frame enclosure formed between partition members 82 and 84, said spin axis 76d being coaxial with the axis 26d of the outer structure 12d; and a third rotor (not shown) having a spin axis 80d is disposed in a third frame enclosure formed between partition member 84 and an end wall of inner frame member 28d the rotor having a spin axis 80d. Suitable means are provided to support each said rotor (not shown) from the walls of its respective frame enclosure. For this purpose, the center frame enclosure between partition walls 82 and 84 is provided with pivot means 86 and 90, coaxially with rotor spin axis 76d as illustrated, for supporting said rotor (not shown); and the end frame enclosure adjacent to partition wall 84 has a pair of pivot means 92, 94, coaxially disposed along its spin axis 80d, for supporting the rotor unit in said enclosure.

The five embodiments illustrated in FIGURES 1 through 16 inclusive in accordance with the invention illustrate vibration damping and isolating gimbal structures or mountings disposed immediately adjacent to the sensitive gyroscopic rotors or devices in both simple and more complex gyroscopes.

While the present invention has been described in more detail in its first preferred embodiment, and in general in its second, third, fourth and fifth embodiments, it will be obvious to those skilled in the art after understanding this invention that various changes and modifications may be made therein without departing from the spirit or scope thereof. It is intended by the appended claims to cover all such modifications.

What is claimed is:
1. In combination with a gyroscope having a rotor, a gimbal mounting for said rotor comprising a first rigid frame member having a pair of inwardly directed coaxial trunnions on opposite sides thereof defining an inner pivot axis;
   a second rigid frame member larger than and circumscribing said first rigid frame member having a pair of outwardly directed coaxial trunnions on opposite sides thereof defining an outer pivot axis and being coplanar with and substantially at right angles to said inner pivot axis; and
   spring means interposed and constituting the sole interconnection between said rigid frame members.
2. The combination as claimed in claim 1 in which the first rigid frame member is coaxial with the second rigid frame member about an axis substantially at right angles to both said inner and outer pivot axes and in which said rotor is pivotally mounted on the trunnions of said first rigid member.
3. The combination as claimed in claim 2 in which the rotor has a spin axis which intersects said inner pivot axis substantially at right angles thereto.
4. The combination as claimed in claim 2 in which the first rigid frame member has spaced elongate support members fixedly connected to and surrounded by said rigid frame member for connecting said rotor thereto.
5. The combination as claimed in claim 2 in which said spring means includes a plurality of annular spring members with each spring member being substantially concentric about one of said axes.
6. The combination as claimed in claim 1 in which said spring means are a pair of elongate spring members which are coaxial along said inner pivot axis and which are connected to said second rigid frame member at opposite portions of the inner side thereof, and which are connected to said first frame member at opposite portions of the outer side thereof.
7. In a gyroscope having a high speed rotor rotatable about a spin axis, an elastic damping and isolating system for pivotally suspending the rotor about a pivot axis transverse to the spin axis of the rotor, said system including a gimbal mounting comprising an outer cylindrical shell member, and an inner cylindrical shell member having a smaller diameter than said outer shell member, said shell members having a common axis and each having an arcuate cross-section;
   said inner shell member having an axis transverse to said spin axis with a pair of tubular pivots coaxial therewith for pivotally suspending said rotor, and said outer shell member having an axis transverse to both said spin axis and said inner shell axis with a pair of tubular pivots coaxial therewith; and
   a pair of springs of rubber-like material disposed between said outer and inner shell members coaxially with said inner pivot axis, each said spring respectively surrounding one of said inner pivots with the radially inner side of each spring being joined to said inner shell member and with the radially outer side of each spring being joined to said outer shell member.

References Cited by the Examiner
UNITED STATES PATENTS

| | | | |
|---|---|---|---|
| 2,438,213 | 3/1948 | Hamilton | 74—5.44 |
| 2,719,017 | 9/1955 | Mordarski | 248—24 |
| 3,037,150 | 5/1962 | Schriner et al. | 248—358 X |

MILTON KAUFMAN, *Primary Examiner.*

J. D. PUFFER, *Assistant Examiner.*